(12) United States Patent
Kokkevis

(10) Patent No.: US 8,913,067 B1
(45) Date of Patent: Dec. 16, 2014

(54) GPU ACCELERATED COMPOSITING ON A MULTITHREADED BROWSER

(75) Inventor: Evangelos Kokkevis, Mountain View, CA (US)

(73) Assignee: Google Inc., Mountain View, CA (US)

( * ) Notice: Subject to any disclaimer, the term of this patent is extended or adjusted under 35 U.S.C. 154(b) by 446 days.

(21) Appl. No.: 13/367,111

(22) Filed: Feb. 6, 2012

Related U.S. Application Data

(60) Provisional application No. 61/448,088, filed on Mar. 1, 2011.

(51) Int. Cl.
*G06T 1/00* (2006.01)
(52) U.S. Cl.
USPC .......................................................... 345/522
(58) Field of Classification Search
CPC ............ G06F 21/53; G06F 2221/2149; G06F 17/2247; G06F 2221/2219; G06F 9/44526; G06F 9/5044; G06F 21/606; G09G 2340/12
USPC .......................................................... 345/522
See application file for complete search history.

(56) References Cited

U.S. PATENT DOCUMENTS

| | | | |
|---|---|---|---|
| 7,353,114 B1 * | 4/2008 | Rohlf et al. ....................... 702/5 |
| 7,836,303 B2 | 11/2010 | Levy et al. | |
| 2004/0051728 A1 * | 3/2004 | Vienneau et al. .............. 345/723 |
| 2008/0275702 A1 * | 11/2008 | Lewis et al. .................... 704/235 |
| 2010/0013842 A1 | 1/2010 | Green et al. | |
| 2010/0017461 A1 | 1/2010 | Kokkevis et al. | |
| 2010/0146523 A1 * | 6/2010 | Brigaut et al. ................ 719/330 |
| 2010/0262780 A1 * | 10/2010 | Mahan et al. ................... 711/118 |
| 2010/0281371 A1 | 11/2010 | Warner et al. | |

* cited by examiner

*Primary Examiner* — Hau Nguyen
(74) *Attorney, Agent, or Firm* — Sterne, Kessler, Goldstein & Fox P.L.L.C.

(57) ABSTRACT

A method for an accelerated rendering of graphics on a webpage. The method comprises providing a layer tree, wherein the layer tree includes a plurality of layers and is in a sandbox environment. The method further comprises identifying a dirty layer within the layer tree, and generating rendering data and the plurality of rendering instructions for processing the dirty layer. The method further comprises storing the rendering data and the plurality of rendering instructions in a storage region outside of the sandbox environment for processing using a graphics processing unit.

22 Claims, 6 Drawing Sheets

GPU ACCELERATED COMPOSITING ON A MULTITHREADED BROWSER

This application claims the benefit of U.S. Provisional Application No. 61/448,088, filed on Mar. 1, 2011 and is incorporated by reference in its entirety.

BACKGROUND

Conventionally, web browsers rely on the central processing unit (CPU) to render content of the webpage. However, as graphics processing units (GPUs) are becoming an integral part of every day computing devices such as smartphones, tablet computing devices, notebooks and laptops, the graphics-rich media, such as 3D graphics and video, are playing an increasingly important role in the user's web experience. One way to increase speed and efficiency of rendering graphics-rich media on a computing device is for a GPU to process the content. For example, processing graphics content on a GPU eliminates expensive and slow copies of large amounts of data to and from system memory. Additionally, a GPU achieves a superior performance in processing complex 3D graphics and video as it is adept at handling complex mathematical computations that are common in 3D graphics and video manipulation, in parallel.

Conventional browsers and renderers, however, operate in a sandbox environment. Because of the sandbox environment, they are unable to issue calls that include graphics commands that manipulate data directly to the GPU.

BRIEF SUMMARY

Methods, systems, and computer-readable medium designed to perform accelerated compositing of a webpage on a multi-threaded browser and a GPU.

According to an embodiment, a method for using a compositor to accelerate the rendering of the three-dimensional (3D) graphics using a GPU is provided. A method includes providing a layer tree, wherein the layer tree includes a plurality of layers and is in a sandbox environment. A method further includes identifying a dirty layer within the layer tree. After the dirty layer is identified, method further includes generating rendering data and rendering instructions for processing the dirty layer, rendering instructions being in a platform-independent language. The method further includes storing the rendering data and the rendering instructions in a storage region outside the sandbox environment for processing on a GPU to render on a webpage.

According to another embodiment, the method includes determining whether the storage region has a memory space for storing rendering instructions and rendering data. When the storage region is full, the method includes blocking rendering instructions and rendering data from being stored in the storage region.

According to another embodiment, the method includes validating the bitmap and the rendering instructions. After the instructions are validated, the method includes translating the rendering instructions into a platform-dependent graphics language. The method further includes executing the translated instructions on the rendering data and displaying the result of the execution on a webpage.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF EMBODIMENTS

While the present invention is described herein with references to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Figure 1:
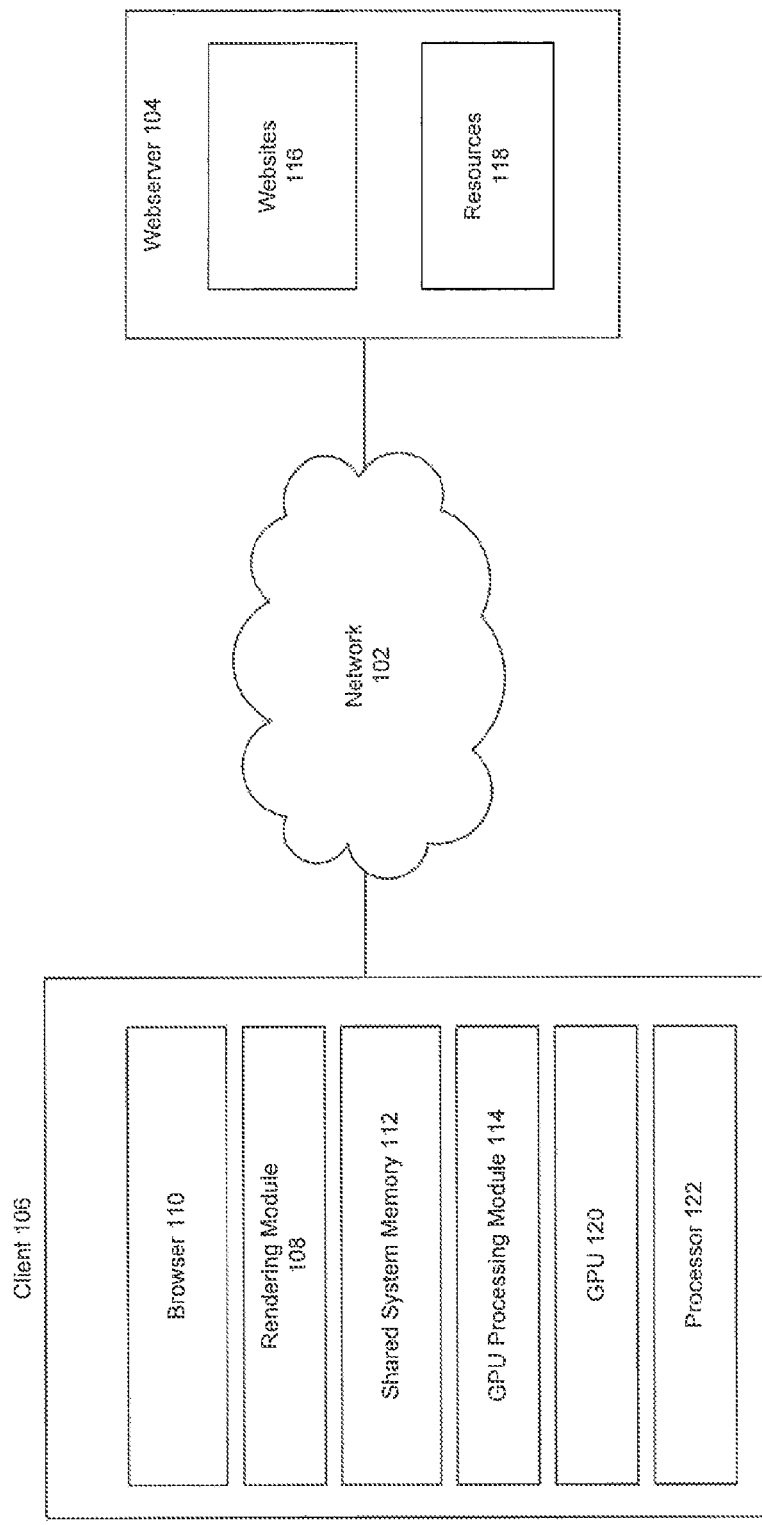
FIG. 1 is a block diagram of an exemplary embodiment of a client and server environment 100.

FIG. 1 is a block diagram of an exemplary embodiment 100 of a client and server environment. The system 100 includes a network 102, a web serve 104 and a client 106. Network 102 connects client 106 and web server 104. Environment 100 may include many thousands of web servers 104 and clients 106.

Network 102 may be any network, or combination of networks, that can carry data communication. Such a network 102 may include, but is not limited to, a local area network, medium area network, and/or wide area network, such as the Internet. Network 102 can support protocols and technologies including, but not limited to, World Wide Web protocols and/or services. Intermediate web servers, gateways, or other servers may be provided between components of the system shown in FIG. 1 depending upon a particular application or environment.

Web server 104 is an electronic device capable of sending, receiving and storing resources 118. Resources 118 are any data that can be provided over network 102. Resources 118 include data inserted into hypertext markup language (HTML) pages, word processing documents, portable document format (PDF) documents, two and three-dimensional images, video, feed sources, and multimedia content, to name only a few. In an embodiment, web server 104 receives a request, such as an HTTP request from client 106, and, in response, sends resources 118 for display to client 106.

Web server 104 hosts multiple websites 116. Website 116 has one or more webpages associated with a domain name and hosted by one or more web servers 104. An example website is a collection of webpages formatted in a HTML that can contain resources 118 described herein, as well as various programming elements, such as scripts.

Client 106 is an electronic computing device capable of requesting, receiving and displaying resources 118 over network 102. Example clients 106 are personal computers, mobile communication devices, (e.g. smartphones, tablet computing devices, notebooks), set-top boxes, game-console embedded systems, and other devices that can send and receive resources 118 over network 102. Client 106 includes a rendering module 108, a browser 110, a shared system memory 112 a GPU processing module 114, a GPU 120 and a processor 122.

GPU 120 is a specialized microprocessor that accelerates graphics rendering on client 106. GPU 120 is efficient at graphics renderings due to its highly parallel architecture that is adept at processing complex mathematical algorithms common in graphics calculations and rendering.

Processor 122 is any conventional or special purpose processor, including, but not limited to, digital signal processor (DSP), field programmable gate array (FPGA), and application specific integrated circuit (ASIC). Processor 122 executes applications such as Browser 110 and rendering module 108.

Browser 110 is an application that client 106 executes to display resources 118 to a user. In an embodiment, browser 110 can be a multi-threaded browser such as a CHROME browser available from Google Inc.

Figure 2:
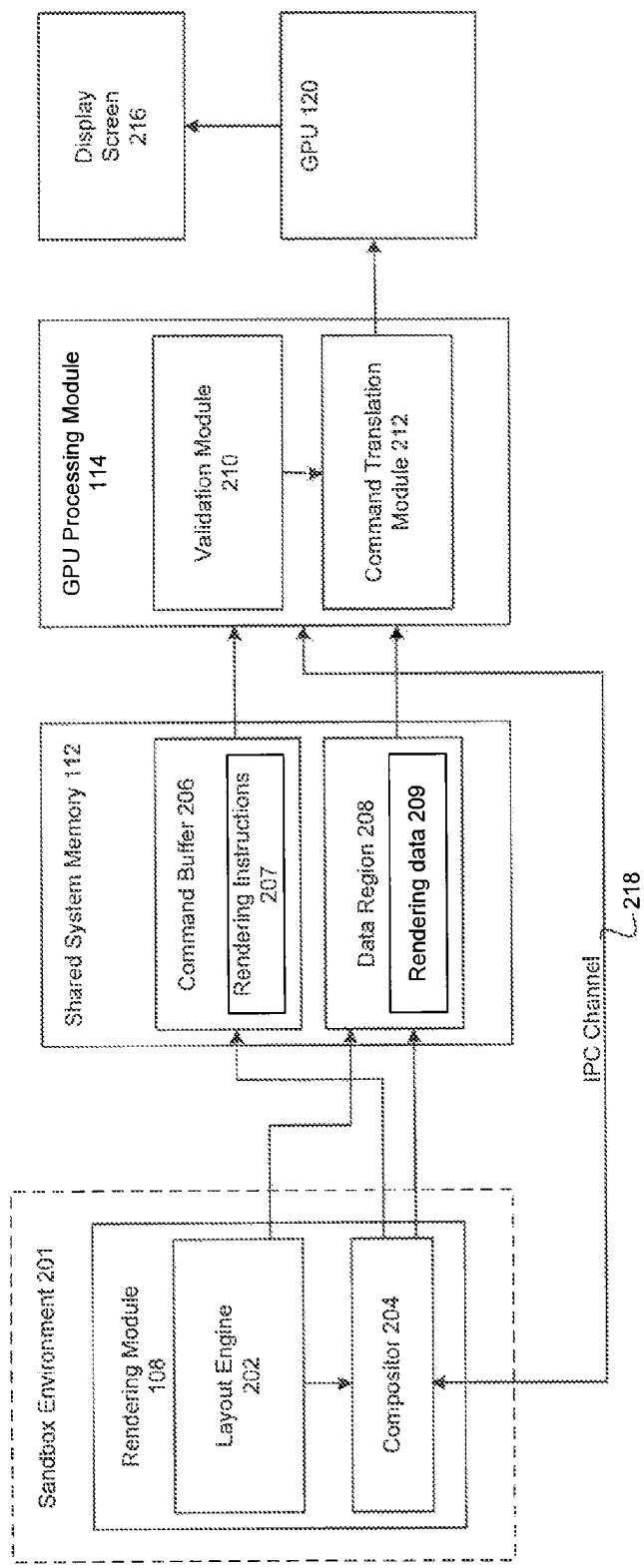
FIG. 2 is a block diagram of an exemplary embodiment for an accelerated generation of a webpage.

Rendering module 108, shared system memory 112 and GPU processing module 114 facilitate an accelerated compositing environment on browser 110. FIG. 2 is an exemplary embodiment of the accelerated compositing environment.

Rendering module 108 and browser 110 are applications that execute in a sandbox environment 201. Applications executing in a sandbox environment 201 have limited access to system memory and other resources available to applications and processes that are executing outside of the sandbox environment 201 on client 106. A person skilled in the art will appreciate that applications may execute in sandbox environment 201 to protect a computing device, such as client 106, from computer viruses and other malicious software. For example, when browser 110 executes in a sandbox environment 201, sandbox environment 201 protects user's privacy from malicious software, cookies and viruses that browser 110 may download by preventing the downloaded software from obtaining unrestricted access to client's 106 system memory.

In an embodiment, instructions and data may be passed between applications internal and external to sandbox environment 201. For example, rendering module 108 communicates with GPU processing module 114 by writing instructions and data into a specific memory location, such as shared system memory 112. GPU processing module 114 is able to access shared system memory 112 and retrieve data and instructions written by rendering module 108.

When client 106 receives messages that include visual content, such as an HTML document that includes resources 118, rendering module 208 initiates the rendering process. Rendering module 208 includes a layout engine 202 and a compositor 204. Layout engine 202 may be an open source engine, such as WebKit. Layout engine 202 receives resources 118 in the HTML document and parses the HTML document into a document object model (DOM) tree. A person skilled in the art will appreciate that tree nodes in a DOM tree store HTML elements and associated text included in the HTML document.

Layout engine 202 generates a rendering object for each node in the DOM tree that produces visual output. Each rendering object presents the content of each node to a display surface. A rendering object presents the content by, for example, storing draw calls that act on the contents of a corresponding DOM tree node. Those draw calls are interpreted by the GPU processing module 114 and are executed using a GPU 120 as described herein. In an embodiment, the generated rendering objects are stored in a rendering object tree.

Layout engine 202 also splits the visual content included in the rendering objects into multiple layers. Layout engine 202 applies an algorithm to the rendering object tree that determines the rendering object(s) that may be included in each layer. In an embodiment, rendering objects that are likely to change independently of the rest of the webpage content are included in a separate layer. For example, when a DOM tree contains a node that includes an image with cascading style sheet (CSS) animation, layout engine 202 includes the image on a layer that is separate from the layer that includes the rest of the webpage. During animation, the image is unlikely to change as it moves around the webpage, whereas the content of the webpage is likely to change as the image moves around. However, because the image is in a separate layer from the rest of the content, layout engine 202 can issue instructions that cause re-rendering of a layer that includes the content, but not the layer that includes the image.

In an embodiment, layout engine 202 may allocate a layer to a rendering object when the rendering object has explicit CSS position properties. In another embodiment, layout engine 202 may allocate a layer to a rendering object when it generates a transparent layer with a particular alpha mask or reflection. In another embodiment, layout engine 202 may allocate a layer to a rendering object when the rendering object includes instructions for a canvas element that has a 3D context or a video element.

Layout engine 202 also generates a layer tree using the generated layers. In an embodiment, the hierarchy of the layer tree indicates the rendering order of the layers on a webpage. The descendents of each parent node in the layer tree include layers that are visually contained within the parent node. Each child node of the parent node is sorted in an ascending order according to the depth index, such as the z-index. The child nodes that contain layers with a negative z-index value are painted below the layer included in the parent node, and the child nodes that contain a layer having a positive z-index value are painted above the layer included in the parent node.

In conventional systems, a conventional layout engine paints the contents of each layer in the layer tree, sequentially, to a single destination bitmap. Because each layer is painted to a single destination bitmap, the entire webpage requires re-rendering when a content of a single layer changes. Additionally, because each layer is painted within the sandbox environment, each layer is painted using a GPU which is inefficient at processing computationally-heavy 3D graphics and video content. Moreover, in conventional systems, once the conventional layout engine paints a bitmap, the bitmap is copied to a browser using a slow and computationally-intensive memory transfer.

Compositor 204 allows layout engine 202 to use the GPU located outside of sandbox environment 201 to process computationally-heavy 3D graphics. Compositor 204 causes layout engine 202 to paint the contents of each layer into multiple bitmaps that are stored in shared system memory 112 located outside of sandbox environment 201, as described below. After the bitmaps are stored in shared system memory 112, compositor 204 determines the layers where content has changed and issues instructions that initiate the layer's re-rendering. Because shared system memory 112 stores layers in multiple bitmaps, a change in one layer does not require re-rendering of the entire webpage.

Compositor 204 identifies each layer in the layer tree that requires re-rendering (a dirty layer) by traversing the layer tree. A dirty layer is a layer whose content has changed and is no being displayed on a webpage. In an embodiment, compositor 204 traverses the layer tree using an in-order traversal. A person skilled in the art will appreciate that in an in-order traversal, compositor 204 recursively retrieves the layers in the left child of a parent node, the parent node, and then the right child of the parent node.

When compositor 204 identifies a dirty layer, compositor 204 initiates a process that causes GPU processing module 114 and GPU 120 to re-render the dirty layer. Because compositor 204 is isolated from GPU processing module 114 due to a sandbox environment 201, compositor 204 issues instructions that cause rendering module 108 to store changes in a dirty layer (also known as rendering data 209) and rendering instructions 207, described herein, in shared system memory 112.

Shared system memory 112 is a memory region on client 106 that is accessible to applications executing in sandbox environment 201 and to applications external to sandbox environment 201. Shared system memory 112 allows rendering module 108 to store rendering instructions and data for rendering each layer. Shared system memory 112 also allows GPU processing module 114 to retrieve those instructions and data for rendering on GPU 120.

Shared system memory 112 includes a command buffer 206 and a data region 208. Data region 208 stores data, such a bitmaps with textures, vertex arrays, etc., and rendering data 209 that is associated with a dirty layer. For example, when compositor 204 identifies a dirty layer in the layer tree, compositor 204 causes layer engine 202 to upload rendering data 209, such as the contents or a portion of a dirty layer, to a bitmap stored in data region 208.

Command buffer 206 is a storage area that stores rendering instructions 207. GPU 120 uses rendering instructions 207 to re-render dirty layers. In an embodiment, rendering instructions 207 are written in a platform-independent graphics language that compositor 204 and GPU processing module 114 understand. In an embodiment, the platform-independent graphics language is a serialized version of OpenGL for embedded systems (OpenGL ES), such as OpenGL ES 2.0 API. A person skilled in the art will appreciate that OpenGL ES API is a graphics language designed for embedded devices such as mobile phones and video-game consoles.

When compositor 204 causes layer engine 202 to upload rendering data 209 to data region 208, compositor 204 also uploads rendering instructions 207 to command buffer 206. An example rendering instructions 207 that compositor 204 uploads to command buffer 206 are instructions that represent a dirty layer as a quad, and instructions that represent a quad as a plurality of triangles. Another example rendering instructions 207 are instructions that upload a bitmap to a texture.

Compositor 204 also stores a data pointer in rendering instructions 207. The data pointer stores the memory address associated with rendering data 209 that corresponds to rendering instructions 207.

In an embodiment, command buffer 206 is a circular buffer. A circular buffer includes a head pointer and a tail pointer that reference a memory region. In an embodiment, when a head pointer points to the same memory address as a tail pointer, command buffer 206 is empty and does not include any rendering instructions 207 that require processing. In another embodiment, when the head pointer and the tail pointer are one address space apart, the command buffer 206 is full.

When compositor 204 determines that the command buffer 206 is full, compositor 204 blocks, and does not write additional rendering instructions 207 into command buffer 206 until there is free memory space in command buffer 206.

GPU processing module 114 includes a validation module 210 and a command translation module 212. GPU processing module 114 uploads and processes rendering instructions 207 and rendering data 209 stored in shared system memory 112. For example, GPU processing module 114 requires rendering instructions 207 that render a portion of a layer using a quad that includes triangles and rendering instructions 207 that upload a bitmap to a texture.

Validation module 210 prevents invalid rendering instructions 207 and rendering data 209 from reaching GPU 120. For example, when rendering module 108 is compromised and begins to issue incorrect rendering instructions 207, validation module 210 prevents those rendering instructions 207 from being executed on GPU 120. Similarly, when rendering module 108 issues rendering data 209 that includes undefined data corrupt data or rendering instructions 207, validation module 210 prevents rendering data 209 from reaching GPU 120. A person skilled in the art will appreciate that examples herein are given by way of example and not limitation, and that multiple validation techniques that validate rendering instructions 207 and rendering data 209 may be used.

Command translation module 212 translates rendering instructions 207 that are in a platform-independent graphics language, into a graphics language that is specific to the computing platform. For example, the graphics language that executes on a Mac OS X or Linux computing platform may be different than the graphics language that may execute on Microsoft Windows. Additionally, with increase of mobile computing devices such as smartphones, tablets, video-game consoles, etc., many traditional graphics languages include a lightweight application programming interface for rendering graphics on those portable devices.

In an embodiment, when client 106 includes a computing platform such as a Mac OS X or Linux, command translation module 212 translates the platform-independent graphics language, such as serialized OpenGL ES, into Desktop GL. In another embodiment, when client 106 includes a computing platform, such as Microsoft Windows, command translation module 212 translates the platform-independent graphics language into Microsoft's Direct 3D (D3D). In an embodiment where GPU 120 is operable to execute a platform-independent graphics language, command translation module 212 forwards rendering instructions 207 and rendering data 209 for rendering to GPU 120.

GPU 120 renders a webpage or re-renders a webpage using translated rendering instructions 207 and rendering data 209. For example, GPU 120 applies translated rendering instructions 207 to rendering data 209 and modifies the content of the dirty layer into a new layer. After GPU 120 modifies the dirty layer, GPU 120 re-composites the dirty layer with existing layers and draws the result directly to the display screen 216 associated with client 106.

In an embodiment, system 200 includes an inter-process communication channel (IPC channel) 218. IPC channel 218 enables GPU processing module 114 to communicate with compositor 204 executing inside of sandbox environment 201, when compositor 204 issues rendering instructions 207 which return a result from GPU processing module 114 or from GPU 120. One example of such a rendering instruction 207 is an instruction that returns a value calculated by GPU 120 or a parameter that returns a state of GPU 120. Compositor 204 may use the returned result to, for example, issue additional rendering instructions 207 or traverse a layer tree.

Figure 3:
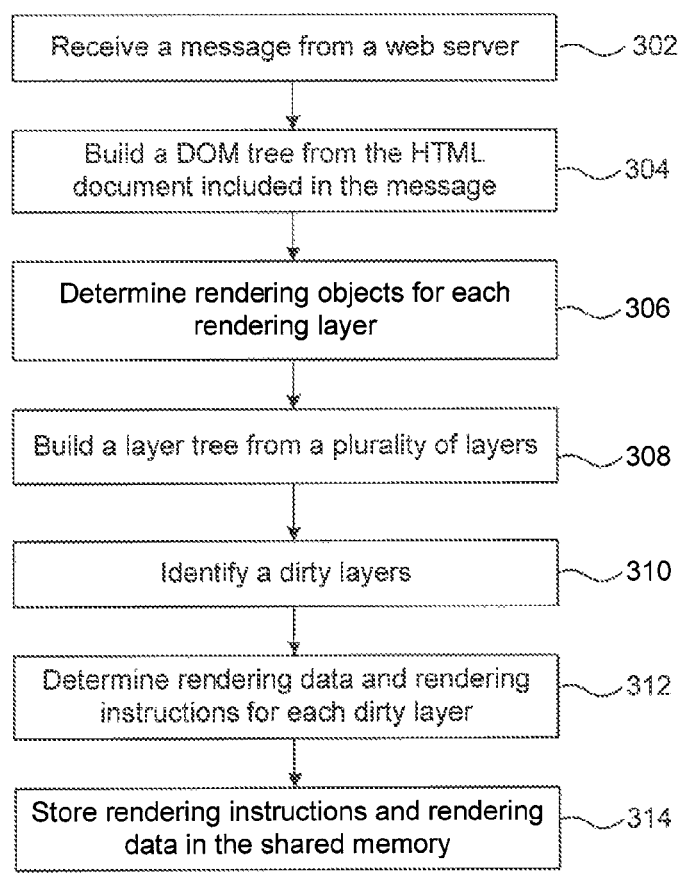
FIG. 3 is a flowchart of a method for preparing a layer for accelerated processing in a sandbox environment.

FIG. 3 is a flowchart of a method 300 for an accelerated processing of a webpage. In method 300, stages 302-310 are processed within sandbox environment 201.

At stage 302, a message is received from a web server. For example, rendering module 108 receives a message from web server 104. The message may include, for example, resources 118 embedded in an HTML document.

At stage 304, a DOM tree is created. For example, rendering module 108 builds a DOM tree and a rendering object tree from a message received in stage 302. As described herein, each node in a DOM tree that includes visual content has a corresponding rendering object in a rendering object tree.

At stage 306, a layer is determined from one or more rendering objects. For example, layout engine 202 determines the rendering objects in the rendering object tree that are included in each layer.

At stage 308, a layer tree is generated. For example, layout engine 202 builds a layer tree from the layers determined in stage 306. As described herein, each layer is a node in a layer tree. The order of each node determines the rendering order of each layer on a webpage.

At stage 310, dirty layers are identified. For example, compositor 204 traverses the layer tree and identifies dirty layers. As described herein, dirty layers are layers that include content that has changed and is not being displayed on a webpage.

Figure 5:
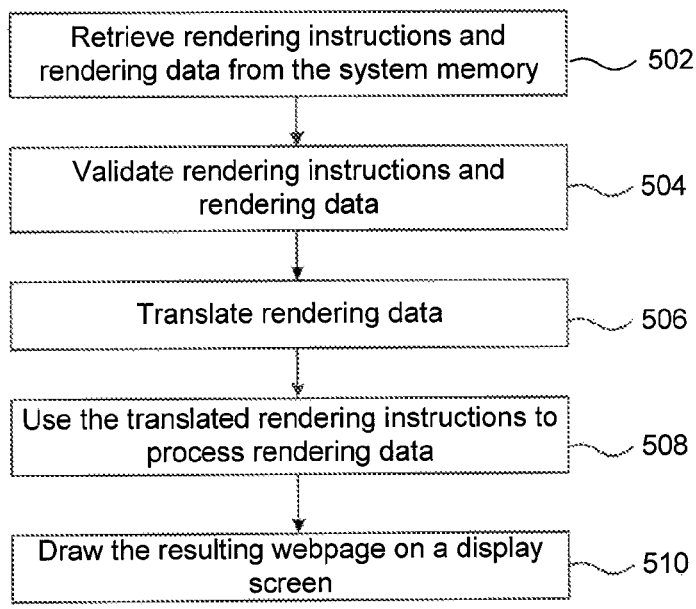
FIG. 5 is a flowchart of a method for accelerated processing of a webpage outside of a sandbox environment.

At stage 312, rendering data and rendering instructions for each dirty layer are determined. For example, compositor 204 determines the rendering data 209 associated with the dirty layer and rendering instructions 207. FIG. 5 is a flowchart of a method 500 for determining rendering instructions 207 and rendering data 209.

At stage 314, rendering instructions and rendering data are uploaded into shared system memory. For example, compositor 204 stores rendering instructions 207 and rendering data 209 associated with each dirty layer in shared system memory 112. At stage 314, compositor 204 also generates a data pointer that contains the memory address of rendering data 209 and includes the pointer in rendering instructions 207. As described herein, shared system memory 112 is a storage area outside of sandbox environment 201. As compositor 204 completes stage 312, rendering instructions 207 and rendering data 209 leave the boundary of sandbox environment 201 and are accessible to GPU processing module 114.

Figure 4:
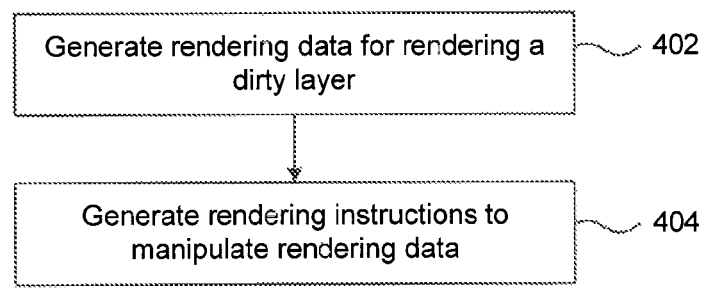
FIG. 4 is a flowchart of a method for generating rendering instructions and rendering data.

FIG. 4 is a flowchart of a method 400 for generating rendering instructions and rendering data.

At stage 402, rendering data for a dirty layer is generated. For example, layout engine 202 determines rendering data 209 as a portion of a dirty layer that is uploaded to a bitmap, or generates a vertex array for the dirty layer.

At stage 404, rendering instructions that manipulate rendering data of stage 402 are generated. For example, compositor 204 generates rendering instructions 207 that may upload rendering data 209, such as bitmap of stage 402, to a texture. In another example, as described herein, compositor 204 may generate rendering instructions 207 that create a quad or a triangle representation of a layer in a platform-independent graphics language, such as a serialized version of OpenGL ES.

FIG. 5 is a flowchart of a method 500 for processing rendering instructions and rendering data using a GPU.

At stage 502, instructions and rendering data are retrieved from a shared system memory. For example, GPU processing module 114 retrieves rendering instructions 207 and rendering data 209 from shared system memory 112.

At stage 504, rendering instructions and rendering data are validated. For example, validation module 210 validates rendering instructions 207 and rendering data 209. If validation module 210 determines that rendering instructions 207 or rendering data 209 are corrupt or incorrect, flowchart 500 ends.

At stage 506, rendering instructions are translated. For example, command translation module 212 translates rendering instructions 207 from instructions in the platform-independent graphics language, into instructions in a graphics language that is compatible with a computing platform executing on client 106.

At stage 508, translated rendering instructions are processed. For example, GPU 120 processes the translated rendering instructions 207 and rendering data 209. At stage 508, GPU 120 also recomposites the processed data with the data from the unmodified layers.

At stage 510, GPU 120 draws the result of stage 508 on a display screen 216.

Figure 6:
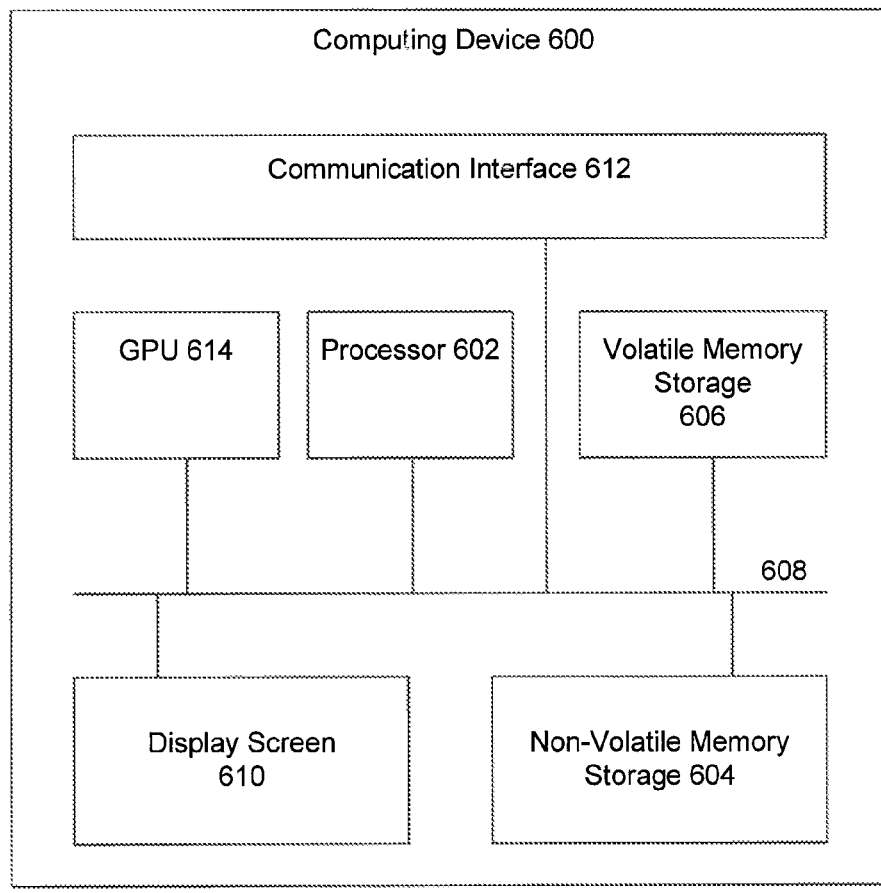
FIG. 6 is a block diagram of an exemplary computing environment.

FIG. 6 is an example computer system 600 in which embodiments of the present invention, or portions thereof, may by implemented as computer-readable code. For example, the components or modules of system 100 may be implemented in one or more computer systems 600 using hardware, software, firmware, tangible computer-readable media having instructions stored thereon, or a combination thereof, and may be implemented in one or more computer systems or other processing systems. Hardware, software, or any combination of such may embody any of the modules and components in FIGS. 1-5.

Web server 104 and client 106 can include one or more computing devices. According to an embodiment, web server 104 and client 106 can include one or more processors 602, one or more non-volatile storage mediums 604, and one or more memory devices 606, a communication infrastructure 608, a display screen 610 and a communication interface 612. Processors 602 can include any conventional or special purpose processor, including, but not limited to, digital signal processor (DSP), field programmable gate array (FPGA), and application specific integrated circuit (ASIC).

GPU 614 is a specialized processor that executes instructions and programs selected for complex graphics and mathematical operations in parallel.

Non-volatile storage 604 can include one or more of a hard disk drive, flash memory, and like devices that can store computer program instructions and data on computer-readable media. One or more of non-volatile storage device 604 can be a removable storage device. Memory devices 606 can include one or more volatile memory devices such as, but not limited to, random access memory. Communication infrastructure 608 can include one or more device interconnection buses such as Ethernet, Peripheral Component Interconnect (PCI), and the like.

Typically, computer instructions executing on web server 104 or client 106 are executed using one or more processors 602 and can be stored in non-volatile storage medium 604 or memory devices 606.

Display screen 610 allows results of the computer operations to be displayed to a user or an application developer.

Communication interface 612 allows software and data to be transferred between computer system 600 and external devices. Communication interface 612 may include a modem, a network interface (such as an Ethernet card), a communication port, a PCMCIA slot and card, or the like. Software and data transferred via communication interface 612 may be in the form of signals, which may be electronic, electromagnetic, optical, or other signals capable of being received by communication interface 612. These signals may be provided to communication interface 612 via a communication path. A communication path carries signals and may be implemented using wire or cable, fiber optics, a phone line, a cellular phone link, an RE link or other communications channels.

Embodiments may also be directed to computer program products comprising software stored on any computer-useable medium. Such software, when executed in one or more data processing device, causes a data processing device(s) to operate as described herein. Embodiments of the invention employ any computer-useable or readable medium. Examples of computer-useable mediums include, but are not limited to, primary storage devices (e.g., any type of random access memory), secondary storage devices (e.g., hard drives, floppy disks, Co ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teachings and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary section may set forth one or more, but not all exemplary embodiments as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for rendering a webpage, comprising:
    generating a layer tree including a plurality of layers, wherein the plurality of layers includes a plurality of rendering objects that render web content on the webpage, and wherein the layer tree exists within a sandboxed environment;
    identifying a dirty layer within the layer tree, the dirty layer having a changed rendering object that renders content changed relative to the web content rendered on the webpage;
    generating, based on the changed rendering object, rendering data and rendering instructions that process the dirty layer; and
    storing the generated rendering data and the rendering instructions in a storage region accessible to components existing within the sandboxed environment and outside the sandboxed environment and accessible to a graphics processing unit (GPU), and wherein the rendering instructions are usable by the GPU to process the rendering data for display on the webpage.

2. The computer-implemented method of claim 1, wherein identifying the dirty layer further comprises traversing the layer tree in the plurality of layers.

3. The computer-implemented method of claim 1, wherein a hierarchy of the layer tree determines an order for rendering each layer.

4. The computer-implemented method of claim 1, wherein each layer in the plurality of layers includes a visual content that corresponds to one or more nodes in a document object mode (DOM) tree.

5. The computer-implemented method of claim 1, wherein the rendering instructions are in a platform-independent language.

6. The computer-implemented method of claim 1, wherein the rendering data includes a bitmap.

7. The computer-implemented method of claim 6, wherein the rendering instructions include instructions for uploading the bitmap to a texture.

8. The computer-implemented method of claim 1, wherein the rendering instructions include instructions for rendering the dirty layer as a quad.

9. The computer-implemented method of claim 1, further comprising:
    determining whether the storage region has memory space available for storing the rendering instructions or rendering data; and
    blocking the rendering instructions or rendering data from being stored in the storage region when the storage region does not have available memory space.

10. A computer-implemented method of claim 1, further comprising:
    validating the rendering data and the rendering instructions;
    translating the rendering instructions into a platform-dependent graphics language;
    executing the translated rendering instructions and the rendering data; and
    displaying the result of the execution on the webpage.

11. The method of claim 1, wherein a rendering object that renders a portion of web content independently from other rendering objects on the webpage is included in a separate layer in the layer tree.

12. The method of claim 11, further comprising:
    identifying the rendering object as the changed rendering object in the dirty layer;
    uploading the rendering data generated from the rendering object to a bitmap in a plurality of bitmaps, wherein the bitmaps include data that is displayed in the webpage; and
    re-rendering the bitmap that includes the uploaded rendering data while displaying the rest of the webpage.

13. A system for rendering a webpage comprising:
    a memory configured to store a layer tree including a plurality of layers, wherein the plurality of layers includes a plurality of rendering objects that render web content on the webpage, and wherein the layer tree exists within a sandboxed environment;
    a compositor configured to:
        operate in the sandboxed environment;
        identify a dirty layer within the layer tree, the dirty layer having a changed rendering object that renders content changed relative to the web content rendered on the webpage;
        generate, based on the changed rendering object, rendering data and rendering instructions that process the dirty layer; and store the generated rendering data and the rendering instructions in a storage region accessible to components within the sandboxed environment and outside the sandboxed environment and accessible to a graphics processing unit (GPU), and wherein the rendering instructions are usable by the GPU to process the rendering data for display on the webpage.

14. The system of claim 13, wherein a hierarchy of the layer tree determines an order for rendering each layer.

15. The system of claim 13, wherein the rendering instructions are in a platform-independent language.

16. The system of claim 13, wherein the rendering data includes a bitmap.

17. The system of claim 16, wherein the rendering instructions include instructions for uploading the bitmap to a texture.

18. The system of claim 13, wherein the rendering instructions include instructions for rendering the dirty layer as a quad.

19. The system of claim 13, wherein the compositor is further configured to:
  determine whether the storage region has a memory space for storing rendering instructions or rendering data; and
  block the rendering instructions or rendering data from being stored in the storage region when the storage region is full.

20. The system of claim 13, further comprising:
  a graphics processing unit (GPU) processing module configured to:
    validate the rendering instructions and the rendering data; and
    translate the rendering instructions into a platform-dependent graphics language; and
  the GPU further configured to:
    execute the translated rendering instructions and the rendering data; and
    display the result of the execution on the webpage.

21. An article of manufacture including a non-transitory computer-readable medium having instructions stored thereon that, when executed by a computing device, cause the computing device to perform operations for rendering a webpage, comprising:
  generating a layer tree including a plurality of layers wherein the plurality of layers includes a plurality of rendering objects that render web content on a webpage, and wherein the layer tree exists within a sandboxed environment;
  identifying a dirty layer within the layer tree, the dirty layer having a changed rendering object that renders content changed relative to the web content rendered on the webpage;
  generating, based on the changed rendering object, rendering data and rendering instructions that process the dirty layer; and
  storing the generated rendering data and the rendering instructions in a storage region accessible to components existing within the sandboxed environment and outside the sandboxed environment and accessible to a graphics processing unit (GPU), and wherein the rendering instructions are usable by the GPU to process the rendering data for display on the webpage.

22. The computer-readable medium of claim 21, wherein the instructions that, when executed by the computing device, cause the computing device to perform operations comprising:
  validating the rendering data and the rendering instructions;
  translating the rendering instructions into a platform-dependent graphics language;
  executing the translated rendering instructions and the rendering data; and
  displaying the result of the execution on the webpage.

* * * * *